Figure 1:
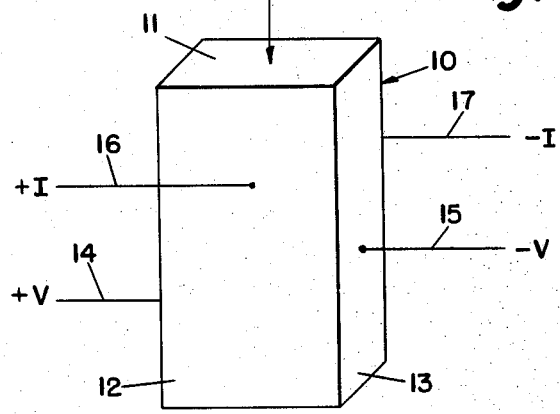

Sept. 1, 1964      A. C. METZGER      3,147,426

HALL EFFECT VOLTAGE GENERATOR

Filed July 21, 1961

INVENTOR.
ARTHUR C. METZGER
BY
S. J. Rotondi, A. J. Dupont + S. Dubroff
ATTORNEYS.

United States Patent Office 3,147,426
Patented Sept. 1, 1964

3,147,426
HALL EFFECT VOLTAGE GENERATOR
Arthur C. Metzger, 113 Hillside Ave., Verona, N.J.
Filed July 21, 1961, Ser. No. 125,882
1 Claim. (Cl. 323—94)
(Granted under Title 35, U.S. Code (1952), sec. 266)

The invention described herein may be manufactured and used by or for the Government for governmental purposes without the payment to me of any royalty thereon.

This invention relates to devices of the type wherein a magnetic field and an electric current are each transmitted between a different pair of opposite surfaces of a Hall effect member to produce an output voltage between the remaining opposite surfaces of this member. Its purpose is to provide an improved voltage generator of this type which avoids the need of slip rings and functions to provide an output voltage representative of a function predetermined by the contour of the opposite surfaces to which the magnetic field is applied.

The Hall effect is defined as "The deflecting effect of a magnetic field on the lines of current flow in an electric circuit." The term "Hall effect member" is used herein to designate a member exhibiting this deflecting effect. Such a member is commonly a semi-conductor, the basic material of which is indium antimonide, indium arsenide, doped ferrites, garnets, silicon, germanium and the like.

Previously available devices of the type under consideration have generally included a rotatable Hall effect member connected to its input and output circuits through slip rings or flexible connections. This unnecessarily complicates the device, especially in cases where a plurality of pairs of input and output terminals are involved. The present invention avoids this difficulty by mounting the Hall effect member in a fixed position and providing means for rotating a magnetic field about this member.

This invention will be better understood from the following description when considered in connection with the accompanying drawings and its scope is indicated by the appended claim.

Figure 2:
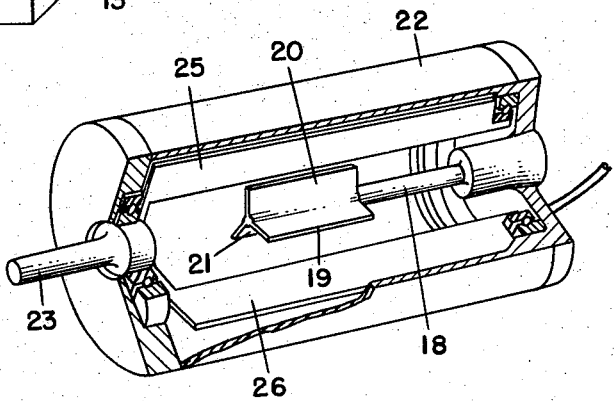
Figure 3:
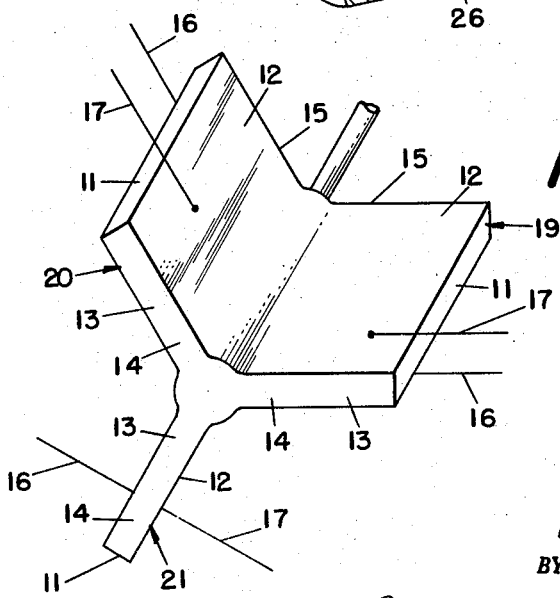

Referring to the drawings:

FIG. 1 is an explanatory diagram relating to the operation of the device of the present invention, FIG. 2 is a prespective view of a preferred form of the invention, and FIG. 3 illustrates certain details of the device.

FIG. 1 illustrates a Hall effect member 10 having opposite surfaces 11 between which a magnetic field $\theta$ is directed. When an input current I is transmitted between the opposite surfaces 12 of this member through input terminals 16 and 17, there is produced between its opposite surfaces 13 and its output terminals 14 and 15 a voltage which may be utilized in various ways. The value of this output voltage is dependent on the product of the magnetic field and the input current and on the angular relation between the field $\theta$ and the opposite surfaces 11, being a maximum when the field is perpendicular to the surfaces and substantially zero when the two are parallel.

The voltage generating device of FIG. 2 includes a plurality of Hall effect members 19, 20 and 21 which are joined together in the form of a Y and are supported on a shaft 18 fixed to an enclosure 22. Rotatable in the enclosure 22 by means of a shaft 23 are three magnetic poles 25, 26 and another not shown. Input current is transmitted through leads 16 and 17 (see FIG. 3) and between the opposite surfaces 12 of the Hall effect members 19, 20 and 21. As indicated by FIG. 2, these various leads are brought out of the enclosure 22 in the form of a multi-conductor cable 23. While the device may be constructed with more than three Hall effect members, one or three is preferable.

As previously indicated, the output voltage available at the terminals 14 and 15 is proportional to the strength of the magnetic field, the value of the input current and the angular position of the Hall effect member with respect to the magnetic field. The proportionality factor depends upon the particular geometrical configuration, the position of the Hall effect material in the magnetic field, and the properties of this material. As a result, a wide range of output characteristics can be realized by a suitable choice of design parameters. For example, if the members 19, 20 and 21 are rectangular in shape at their outer ends and consist of a material having indium antimonide as its basic component, the resulting voltage wave is representative of a sine-cosine function. Voltages representative of other functions are realizable by a judicious selection of the above-mentioned parameters.

I claim:

In a device for providing a voltage representative of a predetermined function, the combination of a plurality of stationary Hall effect members having a common juncture and each having a surface opposite to said juncture, said members also having first and second pairs of opposite surfaces, means for establishing an electric current between the surfaces of the first of said pairs, output terminals connected to the surfaces of the second of said pairs, and means providing a magnetic field which is rotatable with respect to said surface opposite said juncture to produce at said output terminals voltages representative of the angular relation between said field and said surface opposite said juncture.

References Cited in the file of this patent
UNITED STATES PATENTS

| | | |
|---|---|---|
| 2,512,325 | Hansen | June 20, 1950 |
| 2,877,309 | Henisch | Mar. 10, 1959 |
| 3,024,998 | Sua For Sun | Mar. 13, 1962 |